United States Patent
Rainisto

(10) Patent No.: US 9,258,435 B2
(45) Date of Patent: Feb. 9, 2016

(54) METHOD AND APPARATUS FOR A SHARING CAPTURE MODE

(71) Applicant: Nokia Technologies Oy, Espoo (FI)

(72) Inventor: Roope Aleksi Rainisto, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/831,023

(22) Filed: Mar. 14, 2013

(65) Prior Publication Data

US 2014/0267791 A1 Sep. 18, 2014

(51) Int. Cl.
*H04N 1/00* (2006.01)
*H04N 1/42* (2006.01)
*G06F 3/00* (2006.01)

(52) U.S. Cl.
CPC ............ *H04N 1/00204* (2013.01); *G06F 3/005* (2013.01); *H04N 1/00251* (2013.01); *H04N 1/00347* (2013.01); *H04N 1/42* (2013.01); *H04N 2201/0036* (2013.01); *H04N 2201/0039* (2013.01); *H04N 2201/0043* (2013.01); *H04N 2201/0067* (2013.01)

(58) Field of Classification Search
CPC ....... H04N 1/00315; H04N 1/00103–1/00108; H04N 1/00204; H04N 1/00251; H04N 1/00347; H04N 1/42; H04N 2201/0067; H04N 2201/0043; H04N 2201/0036; H04N 2201/0039; G06F 3/005
See application file for complete search history.

(56) References Cited

U.S. PATENT DOCUMENTS

| | | | |
|---|---|---|---|
| 7,460,781 B2 * | 12/2008 | Kanai et al. | 348/211.3 |
| 8,194,541 B2 | 6/2012 | Leppanen et al. | |
| 8,259,186 B2 * | 9/2012 | Kiyoshige | 348/211.99 |
| 2002/0051074 A1 * | 5/2002 | Kawaoka et al. | 348/376 |
| 2004/0150724 A1 * | 8/2004 | Nozaki et al. | 348/211.4 |
| 2005/0193421 A1 * | 9/2005 | Cragun | 348/211.11 |
| 2006/0125928 A1 * | 6/2006 | Wolcott et al. | 348/211.2 |
| 2006/0174206 A1 * | 8/2006 | Jung et al. | 348/211.1 |
| 2007/0199033 A1 * | 8/2007 | Nakagawa et al. | 725/105 |
| 2009/0106362 A1 * | 4/2009 | Kuhlke et al. | 709/204 |
| 2009/0115852 A1 | 5/2009 | Jung et al. | |
| 2009/0284611 A1 * | 11/2009 | Wood et al. | 348/211.1 |
| 2010/0020186 A1 * | 1/2010 | Matsui | 348/211.2 |
| 2010/0085443 A1 * | 4/2010 | Maeda et al. | 348/231.2 |

(Continued)

FOREIGN PATENT DOCUMENTS

WO 2010000920 A1 1/2010

OTHER PUBLICATIONS

International Search Report and Written Opinion of the International Searching Authority for corresponding Patent Cooperation Treaty Application No. PCT/US2014/019964, dated Jun. 3, 2014, 12 pages.

(Continued)

*Primary Examiner* — Jason Flohre
(74) *Attorney, Agent, or Firm* — Harrington & Smith

(57) ABSTRACT

One or more embodiments may provide an apparatus, a computer readable medium, a non-transitory computer readable medium, and a method for operating in a non-sharing capture mode, receiving an indication associated with joining a capture share group, the capture share group comprising at least one other apparatus, transitioning from the non-sharing capture mode to a sharing capture mode associated with the capture share group, based, at least in part, on the indication, causing capturing of a captured image, and sending a representational image indicative of the captured image to the at least one other apparatus.

20 Claims, 11 Drawing Sheets

(56) References Cited

U.S. PATENT DOCUMENTS

| | | | |
|---|---|---|---|
| 2011/0216208 A1* | 9/2011 | Matsuzawa et al. | 348/211.2 |
| 2011/0279726 A1* | 11/2011 | Nishizawa | 348/333.05 |
| 2012/0249808 A1 | 10/2012 | Hirota et al. | |
| 2013/0182138 A1* | 7/2013 | Cho | 348/211.3 |
| 2013/0222627 A1* | 8/2013 | Earnshaw et al. | 348/211.2 |

OTHER PUBLICATIONS

"Samsung Galaxy S3: Sharing with S Beam, Share Shot and More," Droid Life, https://www.youtube.com/watch?v=d474uOl0ol8, Jun. 19, 2012, 1 page.

Bruce, Stacy, "Samsung Promotes the Cool 'Share Shot' Feature in New Galaxy S III Commercial," http://www.talkandroid.com/120939-samsung-promotes-the-cool-share-shot-feature-in-new-galaxy-s-iii-commercial/, Jul. 7, 2012, 8 pages.

Burns, Chris, "Samsung Galaxy S III Share Shot and Buddy Photo Share Hands-On," SlashGear, https://www.youtube.com/watch?v=flmN5pThf-Q, Jun. 19, 2012, 1 page.

La, Lynn, "A Closer Look at the Samsung Galaxy S III's Sharing Features," CNET, http://www.cnet.com/news/a-closer-look-at-the-samsung-galaxy-s-iiis-sharing-features/, Jun. 20, 2012, 15 pages.

* cited by examiner

METHOD AND APPARATUS FOR A SHARING CAPTURE MODE

TECHNICAL FIELD

The present application relates generally to a sharing capture mode.

BACKGROUND

As electronic apparatuses have expanded their capabilities, as well as the number and types of operations they perform, interaction has become increasingly complex and time consuming. For example, apparatus interaction may be prone to errors, confusion, and delay. In some circumstances, a user may miss an opportunity to do something, such as capture an image of an event, due to delays associated with interaction. In other circumstances, a user may avoid utilizing an apparatus capability due to a desire to avoid errors, confusion, or delay. These problems may be more pronounced with regard to a user performing operations associated with capturing and sharing images. Under such circumstances, it may be desirable for a user to be able to capture and share images in a simple, quick, and intuitive manner.

SUMMARY

Various aspects of examples of the invention are set out in the claims.

One or more embodiments may provide an apparatus, a computer readable medium, a non-transitory computer readable medium, and a method for operating in a non-sharing capture mode, receiving an indication associated with joining a capture share group, the capture share group comprising at least one other apparatus, transitioning from the non-sharing capture mode to a sharing capture mode associated with the capture share group, based, at least in part, on the indication, causing capturing of a captured image, and sending a representational image indicative of the captured image to the at least one other apparatus.

In at least one example embodiment, the non-sharing capture mode relates to a capture mode unassociated with sharing at least one image.

In at least one example embodiment, receiving the indication associated with joining the capture share group comprises determining that the at least one other apparatus is available for the capture share group.

In at least one example embodiment, receiving the indication associated with joining the capture share group comprises receiving a capture share request from the at least one other apparatus and sending a capture share acceptance to the at least one other apparatus.

In at least one example embodiment, receiving the indication associated with joining the capture share group comprises scanning for the at least one other apparatus.

In at least one example embodiment, receiving the indication associated with joining the capture share group comprises sending a capture share request to the at least one other apparatus and receiving a capture share acceptance from the at least one other apparatus.

In at least one example embodiment, determination that the at least one other apparatus is available for the capture share group comprises receiving a notification associated with an existing capture share group, and the capture share group is the existing capture share group.

In at least one example embodiment, transitioning from the non-sharing capture mode to the sharing capture mode comprises joining the capture share group.

In at least one example embodiment, determination that the at least one other apparatus is available for the capture share group comprises determining presence status of the at least one other apparatus.

In at least one example embodiment, transitioning from the non-sharing capture mode to the sharing capture mode comprises initiating the capture share group.

One or more example embodiments further determine the representational image.

In at least one example embodiment, the determination of the representational image comprises causing the representational image to be within a size threshold.

In at least one example embodiment, the size threshold is based, at least in part, on a transmission constraint associated with the sharing capture mode.

In at least one example embodiment, the transition constraint is associated with transmission of the representational image in a low power mode.

In at least one example embodiment, the representational image is the captured image.

In at least one example embodiment, the capturing of the capture image causes the sending of the representational image.

In at least one example embodiment, the causation of the sending of the representational image occurs absent an intervening user input. (automatically)

One or more example embodiments further receive a first shared image from the at least one other apparatus.

One or more example embodiments further cause display of a representation of the first shared image.

One or more example embodiments further receive an indication of input indicative of selection of the representation of the first shared image.

One or more example embodiments further send a request for a different version of the first shared image to the at least one other apparatus.

In at least one example embodiment, the different version relates to a different image resolution.

In at least one example embodiment, the first shared image is associated with an image resolution and the different image resolution is associated with a higher resolution than the image resolution.

In at least one example embodiment, the different image resolution relates to full image resolution.

One or more example embodiments further receive a second shared image that correlates to the different version of the first shared image.

One or more example embodiments further cause storage of the second shared image.

One or more example embodiments further receive a request for a different version of the captured image from the at least one other apparatus.

In at least one example embodiment, the different version relates to a different image resolution.

In at least one example embodiment, the representational image is associated with an image resolution and the different image resolution is associated with a higher resolution than the image resolution.

In at least one example embodiment, the different image resolution relates to image resolution of the captured image.

One or more example embodiments further send a different representational image that correlates to the different version of the captured image.

One or more example embodiments further defer sending of the representational image for a cancelation duration.

One or more example embodiments further determine that an input indicative of cancelation has not been received.

One or more example embodiments further determine that an input indicative of cancelation has been received.

One or more example embodiments further preclude sending of the representational image based, at least in part, on the determination that the input indicative of cancelation has been received.

At least one example embodiment provides an apparatus, comprising means for operating in a non-sharing capture mode, means for receiving an indication associated with joining a capture share group, the capture share group comprising at least one other apparatus, means for transitioning from the non-sharing capture mode to a sharing capture mode associated with the capture share group, based, at least in part, on the indication, means for causing capturing of a captured image, and means for sending a representational image indicative of the captured image to the at least one other apparatus.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
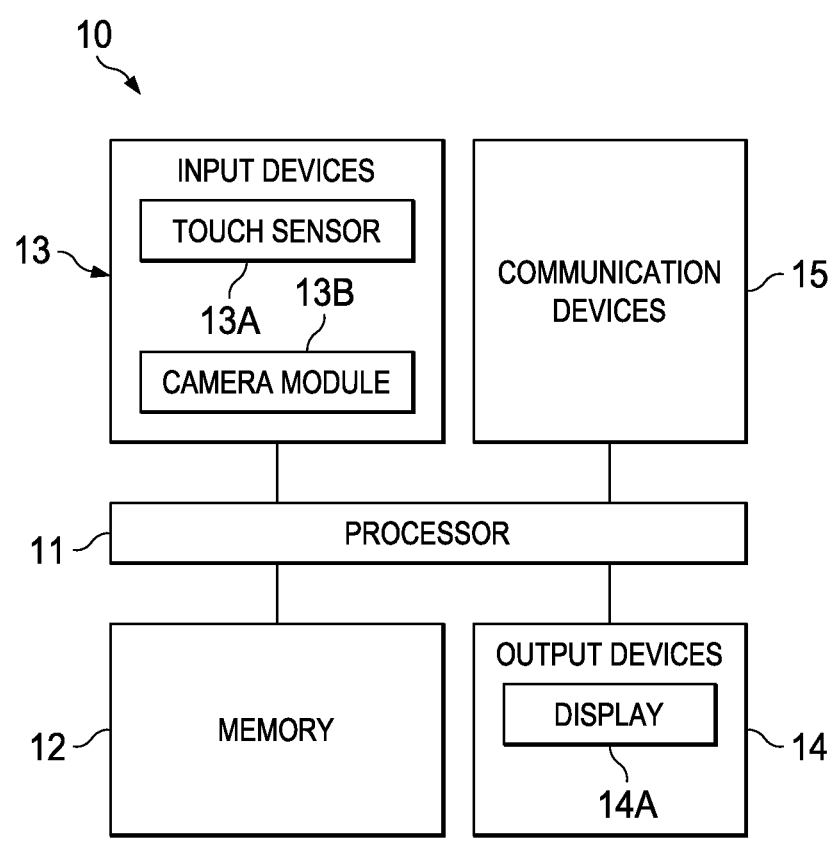
FIG. 1 is a block diagram showing an apparatus, such as an electronic apparatus 10, according to an example embodiment.

An embodiment of the invention and its potential advantages are understood by referring to FIGS. 1 through 11 of the drawings.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to an example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses, may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of an example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise output devices 14. In at least one example embodiment, output devices 14 comprise one or more output devices. Output devices 14 may comprise an audio output device, such as a ringer, an earphone, a speaker, and/or the like. Output devices 14 may comprise a tactile output device, such as a vibration transducer, an electronically deformable surface, an electronically deformable structure, and/or the like. Output devices 14 may comprise a visual output device, such as a display, a light, and/or the like. The electronic apparatus may comprise input devices 13. In at least one example embodiment, input devices 13 comprise one or more input devices. Input devices 13 may comprise a light sensor, a proximity sensor, a microphone, a touch sensor, a force sensor, a button, a keypad, a motion sensor, a magnetic field sensor, a camera, and/or the like. A touch sensor, such as touch sensor 13A, and a display, such as display 14A, may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input devices 13 may comprise a media capturing element. The media capturing element may be any means for capturing an image, video and/or audio for storage, display or transmission. For example, in an example embodiment in which the media capturing element is a camera module, such as camera module 13B, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In an example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2F are diagrams illustrating a sharing capture mode according to at least one example embodiment. The examples of FIGS. 2A-2F are merely examples of a sharing capture mode, and do not limit the scope of the claims. For example, appearance may vary, interaction metaphors may vary, and/or the like.

As camera capabilities have become more prevalent in electronic apparatuses, photography has become a greater part of a user's experience with his electronic apparatus. In some circumstances, the omnipresent nature of a user's electronic apparatus in the user's lifestyle may bring photography into the user's daily social interaction model. For example, it has become more common to see a user capturing images in general circumstances, even absent key events or landmarks. Quite often, photography is not done alone, but is an activity that happens in a crowd of people. For example, the user may be capturing images associated with some kind of event, such as a concert, a wedding, a party, and or the like. Among the many reasons that a user captures images, such as to help capture a moment, to generate a memento of an experience, etc. one rapidly growing motivation for a user to capture an image is to share the experience with others.

Sharing photos is something that many users love to do. Some services try to facilitate such sharing, but may be very complicated and present the user with an undesirable level of complexity and decisions. It may be desirable to be able to provide a photo sharing solution that allows users to avoid such complexity.

In addition, in many circumstances, a user's attention may be focused on the subject matter of an image. For example, a user may be attempting to capture the right moment, may be interested in avoiding missing a nuance of the present experience, and/or the like. For example, a user may desire to share an image of his child's performance at a sporting event, but may desire to reduce any distraction associated with sharing images. In such circumstances, the user may desire to timely share the captured images without undergoing undue distraction while capturing the images. Therefore, it may be desirable to provide an image sharing experience that allows users to make sharing decisions at times when there is less competition for the user's attention. For example, it may be desirable to avoid having the user make separate determinations to share a captured photo. In such an example, the user may desire to share, by default, captured images. In such an example, it may be beneficial to avoid a user interaction to initiate the sharing of a captured image.

In some circumstances, users may be taking photos in a particular context, such as at a particular event, with people that the user does not yet know, and/or do not know how to contact. For example in a concert, the many of people near the user may be strangers. Exchanging photos with these people may be very difficult. The user may not know how to contact them, how to share with them, how to see their images, etc. For example, in a concert, one user may be in the left side of the audience and another user may be on the right hand side of the audience. The user may capture images from his vantage point, but may desire images of the same event from different perspectives may. Such images may help the user to relive the experience better afterwards, or even during the event. In this manner, there is a mutual interest for people to help improve each other's experience by sharing images. In such circumstances, the user may be less concerned with the identity of a user with whom they are sharing images. For example, the user may care more about the perspective of the other user that about the user's identity. It may be desirable to allow a user to share images with such users without a requirement to know the identity of such users.

Similarly, in some circumstances, a user may desire to be aware of happenings beyond the user's immediate perception. For example, two users may be at the same event, such as a party, a wedding, etc. In such circumstances, the users may be in different rooms, different areas, etc. In such circumstances, the users may desire to communicate by capturing images of their experiences without any complexity associated with individual image share, but with the selectivity associated with being able to capture an individual image. For example, the user may desire to avoid sharing video to avoid sharing images that the user does not desire to screen. In such circumstances, the user may be desire to share part of the experience by capturing an automatically shared image. In this manner, users may engage in a photo-based communication, where each user can respond to an image with another image. Such communication may allow a user to control the content of the communication by selectively capturing the image, but may also allow the user to avoid complexity associated with individually selecting to share a captured image. In this manner, a shared image may serve as a quick signal from one user to another user that something is happening.

In at least one example embodiment, an apparatus provides a sharing capture mode. In at least one example embodiment, a sharing capture mode relates to a capture mode in which a user may capture an image, and send the image to another user without performing an intervening input. In at least one example embodiment, a capture mode relates to an interface that allows a user to control a camera module, such as camera module 13B of FIG. 1, the visual information presented in association with the capture mode, and/or the like. For example, the capture mode may allow a user to invoke an action, such as an image capture operation, for example to take a picture. In another example, the capture mode may provide a control interface that allows a user to control setting associated with visual capturing, such as filter setting, visual effect settings, file management settings, etc. The invocation of an action and/or the control of settings may be by way of received input from a user, such as a key press, a touch, a gesture, and/or the like. In at least one example embodiment, an apparatus may operate in a capture mode by way of providing at least part of the capture mode to the user, precluding a different capture mode from the user, and/or the like. In at least one example embodiment, a capture mode may cause capturing of an image. In at least one example embodiment, an image that has been captured by way of a capture mode is referred to as a captured image. In at least one example embodiment, an apparatus causes capture of a captured image by way of sending a command to a camera module, by way of storing an image received form a camera module, and/or the like. In at least one example embodiment an image is sent by way of a communication device, such as one or more device comprised in communication devices 15 of FIG. 1.

In at least one example embodiment, a sharing capture mode is a capture mode associated with a captured image being sent to one or more other apparatuses automatically. In at least one example embodiment, automatically sending an image relates to sending of an image based, at least in part, on a non-sending user invocation, such as an image capture, absent any intervening user input associated with causation of the sending. For example, an intervening user input associated with causation of sending may comprise selecting an image to be sent, selecting a recipient to which to send the image, selecting an interactive element, such as a button or an icon, to invoke the sending, and/or the like. In at least one example embodiment, capturing of an image in a sharing capture mode invokes sending of the captured image to another apparatus.

Figure 2A:
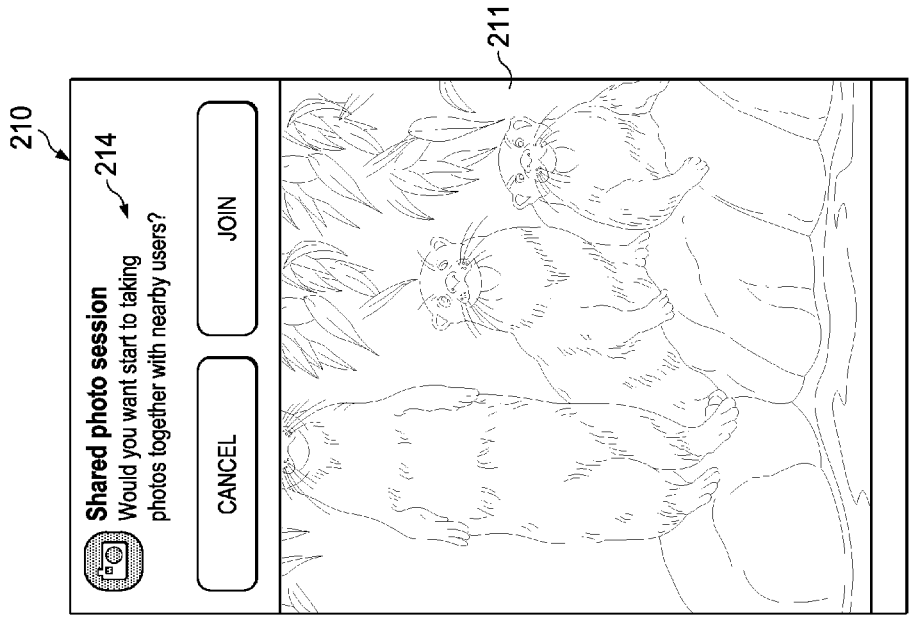
FIGS. 2A-2F are diagrams illustrating a sharing capture mode according to at least one example embodiment.

FIG. 2A is a diagram illustrating a sharing capture mode according to at least one example embodiment. The example of FIG. 2A may relate to a non-sharing capture mode. In at least one example embodiment, a non-sharing capture mode relates to a capture mode that fails to automatically send an image based, at least in part, on capture of the image. For example, the non-sharing capture mode may preclude sending of a captured image in the absence of an intervening user input associated with the captured image. For example, a non-sharing capture mode may relate to a capture mode that fails to automatically send a captured image, but allows a user to cause sending of the captured image by performing an input after the image is captured. In at least one example embodiment, the non-sharing capture mode relates to a capture mode unassociated with sharing at least one image.

The example of FIG. 2A relates to an apparatus operating in non-sharing capture mode 200. In at least one example embodiment, a non-sharing capture mode relates to a capture mode that provides a viewfinder. In at least one example embodiment, a viewfinder relates to information representing image information being received from a camera module. For example, a viewfinder may indicate an image that is being received by a camera module. The user may utilize the viewfinder in determining what the content of a captured image may be. In the example of FIG. 2A, non-sharing capture mode 200 comprises viewfinder 201, and other information associated with capturing an image, such as a capture actuator, a setting indicator, and/or the like.

Figure 2B:
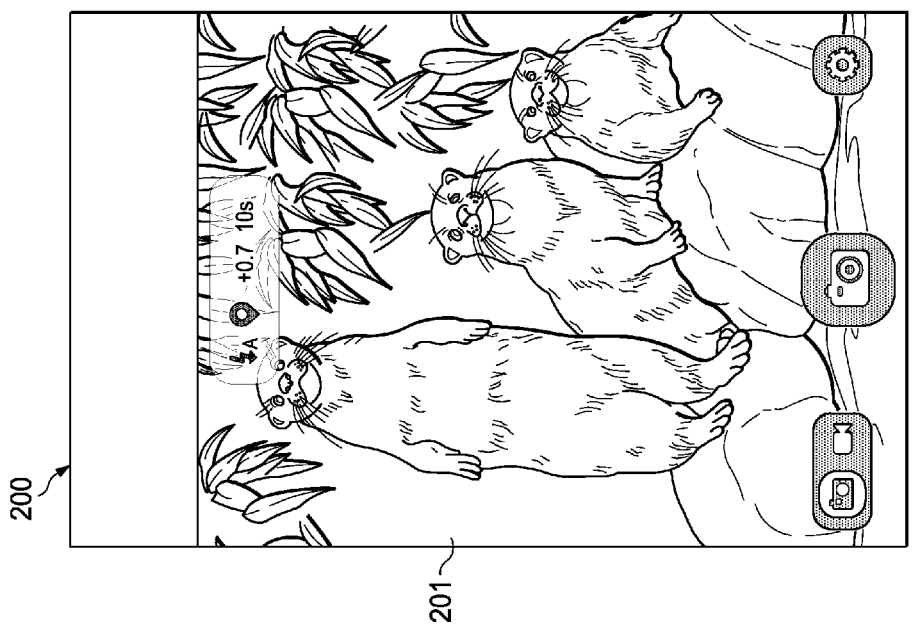

FIG. 2B is a diagram illustrating a sharing capture mode according to at least one example embodiment. The example of FIG. 2B relates to a non-sharing capture mode user query to join a capture share group. In the example of FIG. 2B, non-sharing capture mode 210 provide viewfinder 211 and user query 214. In at least one example embodiment, a capture share group relates to at least one other apparatus with which the apparatus may share images with by way of a sharing capture mode. In at least one example embodiment, a capture share group relates to a protocol related construct that identifies one or more apparatuses as being part of a capture share group. For example, there may be a designation within a wireless communication protocol that identifies one or more apparatuses that are associated with each other by way of inclusion in a capture share group. For example, communications may identify a message to be directed to such a designation. In at least one example embodiment, a capture share group relates to an ad-hoc categorization of one or more other apparatuses that utilize point to point communication for, at least, the purpose of sharing captured images by way of a sharing capture mode. In at least one example embodiment, a capture share group relates to a group that is based, at least in part, on proximity to each other, being located within a region, and/or the like. For example, the capture share group may relate to one or more other apparatuses that may be communicated with by way of a low power wireless interface.

In at least one example embodiment, an apparatus enables sending and/or receiving of captured images related to a sharing capture mode by joining a capture share group. Joining a capture share group may relate to informing at least one other apparatus of communication information associated with sending and receiving an image, may relate to providing notification of inclusion in a capture share group, and/or the like. In at least one example embodiment, joining a capture share group is similar as described regarding FIG. 3A.

In at least one example embodiment, an apparatus may provide a user with a user query to join a capture share group. In at least one example embodiment, a user query to join a capture share group relates to an interface that provides a user with a selectable option to be included in a capture share group. For example, if the user elects to forgo joining the capture share group, the apparatus may remain in a non-sharing capture mode. In another example, if the user elects to join the capture share group, the apparatus may transition from the non-sharing capture mode to a sharing capture mode associated with the capture share group. In at least one example embodiment, the apparatus may automatically join a capture share group. For example, the apparatus may recognize a user, an apparatus, the capture share group, and/or the like. For example, the apparatus may utilize historical information, contact information etc. to identify one or more users, apparatuses, the capture share group and/or the like. In such an example, the apparatus may identify a user that corresponds with contact information stored by the apparatus as being associated with the capture share group, and automatically join the capture share group based on the identification.

In at least one example embodiment, a sharing capture mode is associated with a capture share group by way of the sharing capture mode causing a captured image to be sent to one or more apparatus associated with the capture share group. For example, a sharing capture mode may be associated with a capture share group in that capturing a captured image by way of the sharing capture mode causes sending of the captured image to other apparatuses that have joined the capture share group.

In at least one example embodiment, transitioning from a capture mode to a different capture mode relates to discontinuing operation in the capture mode and initiating operation in the different capture mode. For example, transitioning from a non-sharing capture mode to a sharing capture mode may comprise discontinuing the non-sharing capture mode and initiating the sharing capture mode. In another example, transitioning from a sharing capture mode to a non-sharing capture mode may comprise discontinuing the sharing capture mode and initiating the non-sharing capture mode.

Figure 2C:
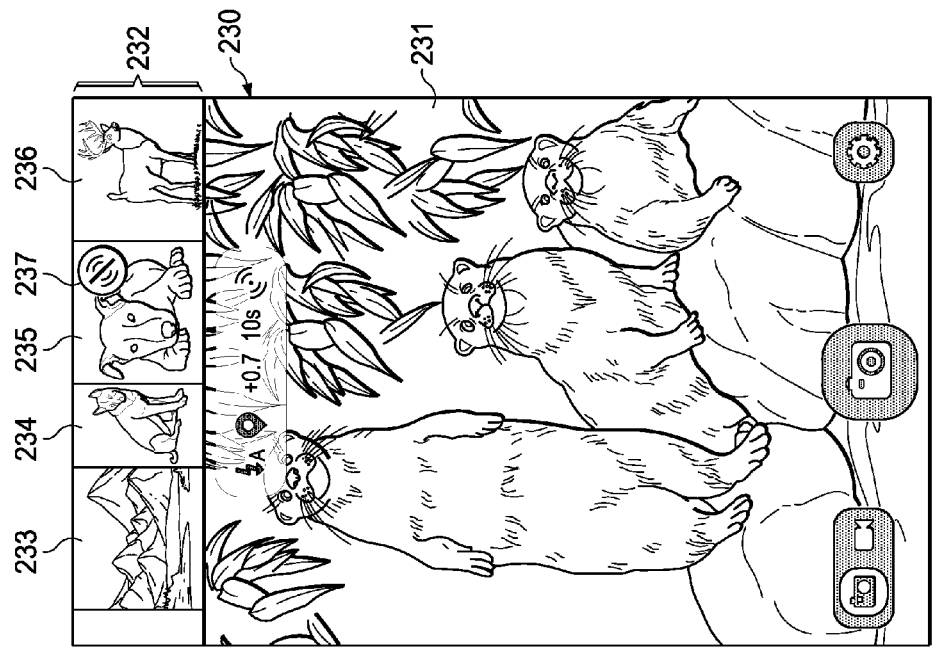

FIG. 2C is a diagram illustrating a sharing capture mode according to at least one example embodiment. In at least one example embodiment, a sharing capture mode allows a user to view one or more shared images. In at least one example embodiment, a shared image relates to an image that was received from another apparatus in association with a sharing capture mode. In at least one example embodiment, an apparatus causes display of at least one shared image. In at least one example embodiment, the causation of display is performed such that the user may view the at least one shared image simultaneous with viewing a viewfinder of a sharing capture mode. For example, there may be a shared image region. In at least one example embodiment, a shared image region relates to a display region in which one or more shared images are provided. In at least one example embodiment, the shared image region is configured to be displayed in conjunction with a viewfinder in a sharing capture mode. For example, an apparatus may cause display of one or more shared images in a shared image region and cause display of a viewfinder.

In at least one example embodiment, captured images may be provided in the shared image region. For example, the shared image region may comprise representations of one or more shared images and one or more captured images. In at least one example embodiment, a representation of an image relates to visual information that, at least, resembles the image. For example, a representation of an image may relate to the image, another image relating to a different resolution version of the image, another image relating to a different sized version of the image, and/or the like. In at least one example embodiment, resolution relates to pixel content, pixel density, and/or the like. For example, an image may have a higher resolution than another image by way of having more pixels, more pixels per area measurement, and/or the like. In at least one example embodiment, a representation of an image may relate to a thumbnail image.

The example of FIG. 2C illustrates viewfinder 221 in relation to shared image region 222. In the example of FIG. 2C, shared image region comprises representations 223, 224, 225 and 226. Representations 223, 224, and 226 may relate to representations of shared images. For example, representation 223 may relate to a shared image received from another apparatus, representation 224 may relate to a shared image received from the other apparatus, and representation 226 may relate to a shared image received from a different other apparatus. Representation 225 may relate to a captured image. For example, the apparatus may have captured a captured image represented by representation 225. In at least one example embodiment, the apparatus sent a representation of the captured image to another apparatus. In at least one example embodiment, a representation of a captured image that is sent to another apparatus differs from a representation of the captured image comprised by a shared image region. For example, the representation of a captured image that is sent to another apparatus may have a different resolution than the representation of the captured image comprised by a shared image region.

Figure 2D:
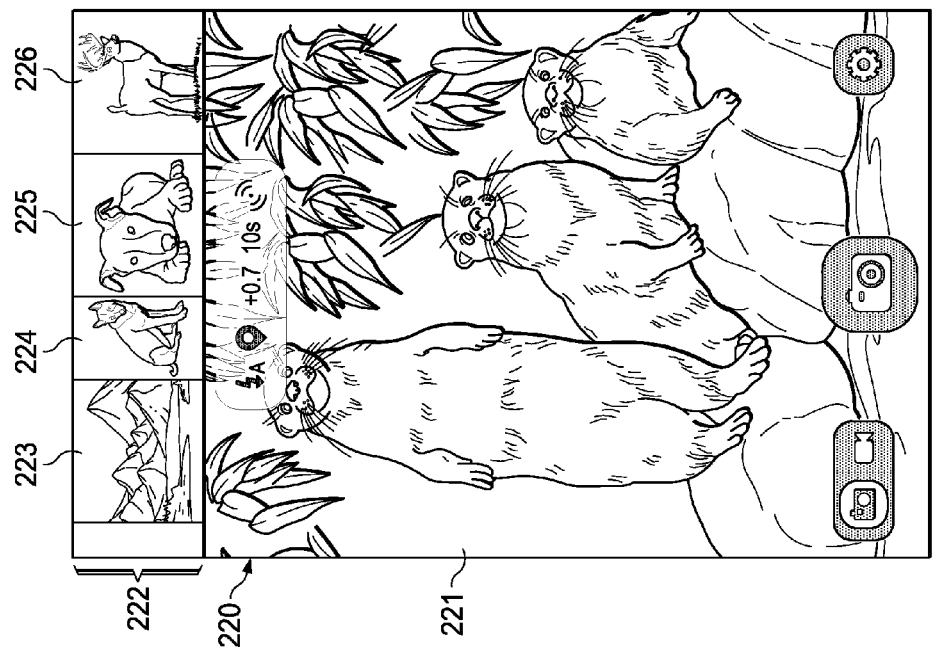

FIG. 2D is a diagram illustrating a sharing capture mode according to at least one example embodiment. In at least one example embodiment, it may be desirable to allow a user to avoid sending a captured image to another apparatus, even though the captured image was captured by way of a sharing capture mode. For example, the user may determine, after capture, that the image is inappropriate for sharing. In such an embodiment, the apparatus defers sending of a representation of the captured image for a time period. In at least one example embodiment, a time period for which sending of a captured image is deferred in a sharing capture mode is referred to as a cancelation duration. In at least one example embodiment, a user can preclude sending of a representation of the captured image by performing an input indicative of cancelation. For example, the user may perform a gesture associated with cancelation, may select a menu item to perform cancelation, may select a representation of the captured image, etc. to indicate cancelation. In at least one example embodiment, preclusion of sending a representation of a captured image comprises avoiding execution of an operation associated with causation of sending the representation.

In at least one example embodiment, an apparatus may include a representation of a captured image that has been precluded from being sent in the shared image region. In at least one example embodiment, the representation of the captured image that has been precluded from being sent may comprise an indication that sending was precluded. Such an indication may relate to an icon, a border, a color change, and/or the like. The example of FIG. 2D illustrates viewfinder 231 in relation to shared image region 232. In the example of FIG. 2D, shared image region comprises representations 233, 234, 235 and 236. Representations 233, 234, and 236 may relate to representations of shared images. For example, representation 233 may relate to a shared image received from another apparatus, representation 234 may relate to a shared image received from the other apparatus, and representation 236 may relate to a shared image received from a different other apparatus. Representation 235 may relate to a captured image. Representation 235 may relate to a captured image that has been precluded from being sent. In the example of FIG. 2D, representation 235 comprises an indication that the captured image that has been precluded from being sent.

Figure 2F:
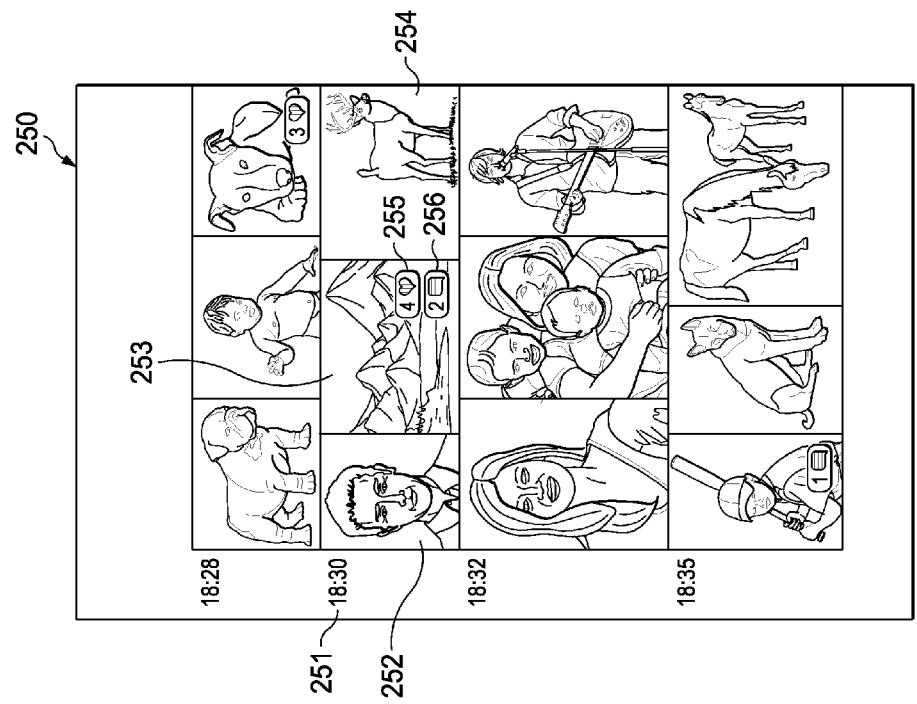
Figure 2E:
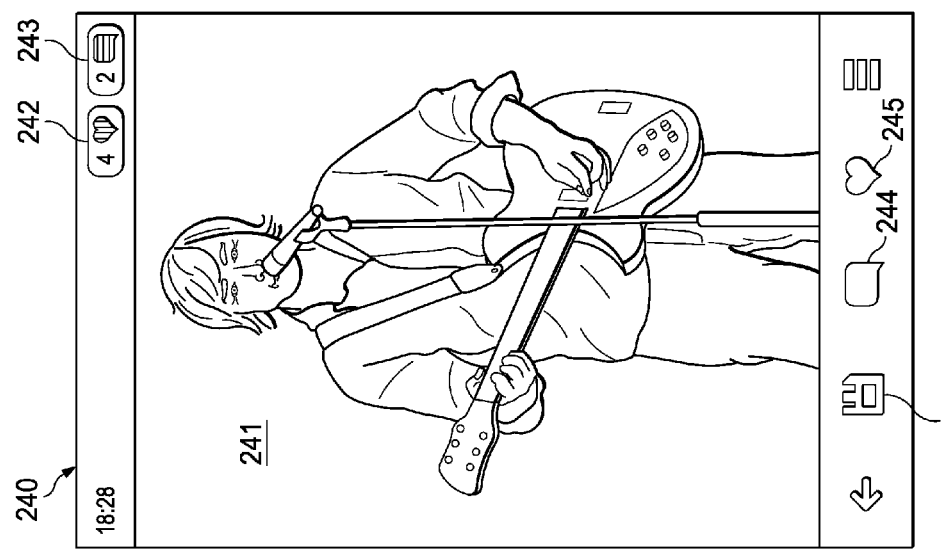

FIG. 2E is a diagram illustrating a sharing capture mode according to at least one example embodiment. In some circumstances, a user may desire to view a different representation of a shared image that the representation provided in a shared image region. For example a user may desire to view a higher resolution version of the shared image. In at least one example embodiment, an apparatus provides an image view that may be invoked from an sharing capture mode. For example, a user may perform an input indicative of selection of a shared image, such as performing a tap input associated with a representation of the shared image. The example of FIG. 2E illustrates a view 240 of a different representation 241 of a shared image. In at least one example embodiment, the apparatus generates the different representation for the view. For example, the representation of the shared image included in the shared image region may be less than the full resolution of the shared image and the representation of the view may be full resolution greater resolution than the representation of the shared image included in the shared image region, and/or the like.

Figure 3A:
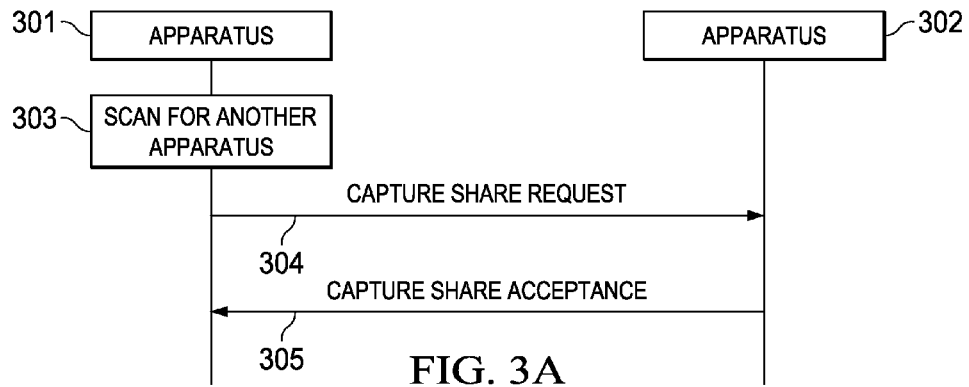
FIGS. 3A-3F are interaction diagrams illustrating interaction associated with a sharing capture mode according to at least one example embodiment.
Figure 3B:
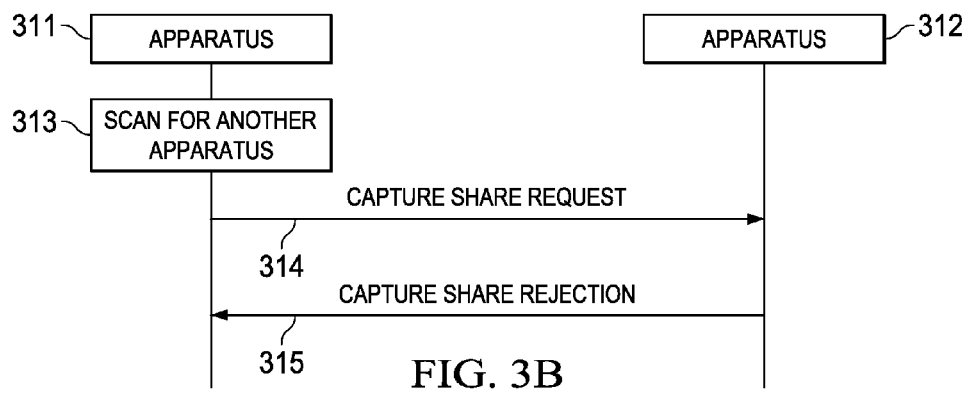
Figure 3C:
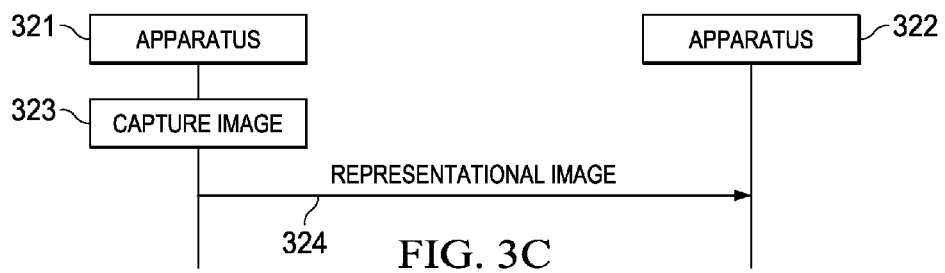
Figure 3D:
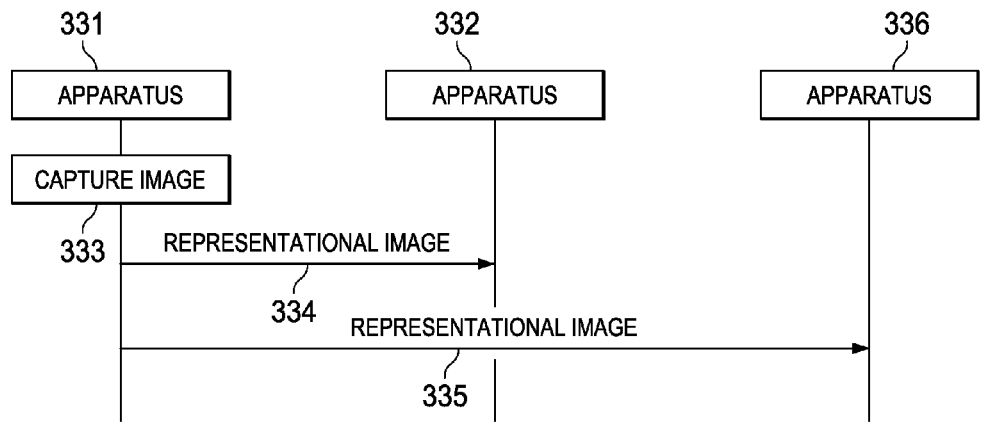
Figure 3E:
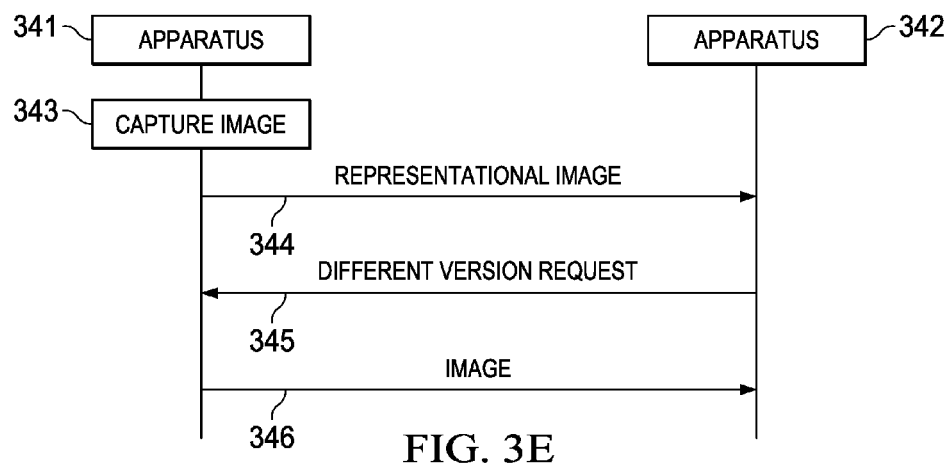

In at least one example embodiment, the apparatus may request a different version of the shared image based, at least in part, on the selection, similar as described regarding FIG. 3E. In at least one example embodiment, the representation of the shared image of the view may be based, at least in part, on the different version of the shared image. For example, the shared image may relate to a lower resolution than the different version of the shared image. In at least one example embodiment, the different version of the shared image relates to a full resolution version of the shared image. In at least one example embodiment a full resolution relates to a resolution at which the image was captured. For example, a shared image may be a thumbnail of an associated captured image. In such an example, the apparatus may request a full resolution version of the shared image for the view.

In at least one example embodiment, receiving an indication of an input indicative of selection of a representation of a shared image causes a request for a different version of the shared image.

A user may desire to store a shared image. In at least one example embodiment, an apparatus causes storage of a shared image. The storage may be caused by way of the view, by way of the shared capture mode, and/or the like. The storage may relate to storing the shared image, a different version of the shared image, and/or the like. For example, the apparatus may request a different version of the shared image for storage based, at least in part, on receiving an indication of an input indicative of selection of a representation of the shared image.

Figure 3F:
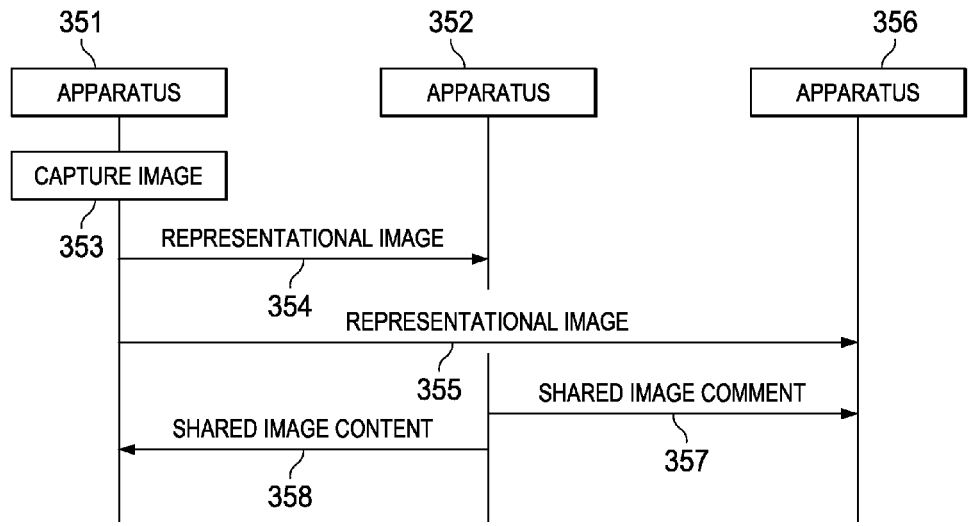

In some circumstances, user may desire to express an opinion regarding a shared image, similar as described regarding FIG. 3F. For example, a user may desire to indicate that the user likes a shared image. In another example, a user may desire to provide a comment regarding a shared image. In at least one example embodiment, a representation of a shared image comprises an indication of existence of an associated like or comment. In the example of FIG. 2E, comment indicator 243 and like indicator 242 provide an indication that there are 4 received user opinions regarding liking the shared image, and an indication that there are 2 received comments regarding the shared image.

In at least one example embodiment, the view may comprise one or more indicators associated with storage, providing a comment, or expressing a like. For example, receiving an indication of an input indicative of selection of one of the indicators may invoke an operation associated with the indicator, such as causing storage, sending a comment, sending a like expression, and/or the like. In the example of FIG. 2E, indicator 246 is associated with causation of storage of the shared image, indicator 244 is associated with sending a comment, and indicator 245 is associated with sending a like expression.

FIG. 2F is a diagram illustrating a sharing capture mode according to at least one example embodiment. A user may desire to view representations of shared images in relation to a time at which the shared images were captures, a time at which the shared images were received, and/or the like. In at least one example embodiment, representations of shared images may be positioned in an arrangement that indicates time relationships among the shared images. For example, representation of shared images may be arranged such that shared images associated with similar times are arranged on a common axis with each other. In at least one example embodiment, such a view may comprise a plurality of shared image regions. For example, there may be a plurality of shared image regions that are arranged in parallel axis. In at least one example embodiment, a representation of a shared image comprises an indication of existence of an associated like or comment. In the example of FIG. 2F, time relationship view 250 comprises a plurality of shared image regions associated with various time references. In the example of FIG. 2F, time relationship view comprises time reference 251 shown proximate to a shared image region that comprises representations 252, 253 and 254 of shared images. It can be seen that representation 253 comprises indicator 255, which indicates 4 like expressions associated with the shared image of representation 253, and indicator 256, which indicates 2 comments associated with the shared image of representation 253.

FIGS. 3A-3F are interaction diagrams illustrating interaction associated with a sharing capture mode according to at least one example embodiment. The examples of FIGS. 3A-3F are merely an examples of interaction associated with a sharing capture mode, and do not limit the scope of the claims. For example, communications may vary, order of communications may vary, and/or the like.

FIG. 3A is an interaction diagram illustrating interaction associated with a sharing capture mode according to at least one example embodiment. In at least one example embodiment, an apparatus may interact with at least one other apparatus in association with a transition from a non-sharing capture mode to a sharing capture mode associated with a sharing group that includes the other apparatus.

In at least one example embodiment, an apparatus receives an indication associated with joining a capture share group, the capture share group comprising at least one other apparatus. In at least one example embodiment, receiving the indication associated with joining the capture share group comprises determining that the at least one other apparatus is available for the capture share group. In at least one example embodiment, availability of the share capture group relates to a possibility that the other apparatus may join the sharing group, the other apparatus being in a capture share group, and or the like. For example, determination that the at least one other apparatus is available for the capture share group may comprise determining presence status of the at least one other apparatus. In at least one example embodiment, presence status relates to a status that indicates presence of the other apparatus in a capacity indicative of eligibility to be included in the capture share group. For example, if the capture share group is based, at least in part, on proximity, the presence status may relate to the other apparatus being within proximity eligibility, being beyond proximity eligibility, etc. In another example, presence status may indicate that a particular apparatus is in a capture share group, is not in a capture share group, and/or the like.

In at least one example embodiment, determining that the at least one other apparatus is available for the capture share group comprises scanning for the at least one other apparatus. In at least one example embodiment, scanning for the at least one other apparatus comprises utilizing a communication device, such as a communication device of communication devices 15 of FIG. 1. Scanning may relate to evaluating information associated with a signal from the other device, such as signal strength, apparatus identity, apparatus capability, and/or the like. For example, scanning may comprise requesting information from the other device, evaluating strength of a transmitted signal from the other device and/or the like.

In at least one example embodiment, receiving the indication associated with joining the capture share group comprises sending a capture share request to the at least one other apparatus and receiving a capture share acceptance from the at least one other apparatus. In at least one example embodiment, a capture share request relates to a communication that involves information associated with joining a capture share group, such as apparatus identity information, session handing information, etc. In at least one example embodiment, a capture share request is communicative of a desire for the apparatus to enter into a capture share group with the other apparatus. The sending and receiving may be by way of a communication device, such as a communication device of communication devices 15 of FIG. 1. In at least one example embodiment, a capture share acceptance relates to a communication that involves information associated with joining a capture share group, such as apparatus identity information, session handing information, etc. In at least one example embodiment, a capture share acceptance is communicative of a desire for the apparatus to enter into the capture share group requested by the other apparatus.

In at least one example embodiment, transitioning from the non-sharing capture mode to the sharing capture mode comprises initiating a capture share group. Initiation of the capture share group may involve establishment of a peer-to-peer communication relationship, assumption of communication server responsibilities associated with sharing, and/or the like. For example, initiating a capture share group may comprise generating an identity to be associated with the capture share group. In at least one example embodiment, determination that the at least one other apparatus is available for the capture share group comprises receiving a notification associated with an existing capture share group. In at least one example embodiment, an existing share group relates to a share group that has already been initiated, for example, initiated by the other apparatus. In at least one example embodiment, transitioning from the non-sharing capture mode to the sharing capture mode comprises joining the capture share group. Joining the capture share group may comprise sending a capture share request, sending a capture share acceptance, and/or the like.

In at least one example embodiment, receiving the indication associated with joining the capture share group comprises receiving a capture share request from the at least one other apparatus. In at least one example embodiment, transitioning from the non-sharing capture mode to the sharing capture mode comprises sending a capture share acceptance to the at least one other apparatus In the example of FIG. 3A, apparatus 301 scans for another apparatus at block 303. In the example of FIG. 3A, apparatus 301 determines that apparatus 302 is available for a capture share group. Apparatus 301 sends capture share request 304 to apparatus 302. Apparatus 302 receives capture share request 304. In the example of FIG. 3A, apparatus 302 determines to join the capture share group associated with the capture share request, similar as described regarding FIG. 2B, sends capture share acceptance 305 to apparatus 301, and transitions from a non-sharing capture mode to a sharing capture mode. In the example of FIG. 3A, apparatus 301 receives capture share acceptance 305 and transitions from a non-sharing capture mode to a sharing capture mode.

FIG. 3B is an interaction diagram illustrating interaction associated with a sharing capture mode according to at least one example embodiment. In at least one example embodiment, an apparatus may determine not to join a capture share group. For example, a user may desire to retain privacy of captured images. In such circumstances, the apparatus may respond to a capture share request by sending a capture share rejection.

In the example of FIG. 3B, apparatus 321 scans for another apparatus at block 313. In the example of FIG. 3B, apparatus 311 determines that apparatus 312 is available for a capture share group. Apparatus 311 sends capture share request 314 to apparatus 312. Apparatus 312 receives capture share request 314. In the example of FIG. 3B, apparatus 312 determines not to join the capture share group associated with the capture share request, similar as described regarding FIG. 2B, sends capture share rejection 315 to apparatus 301, and continues to operate in a non-sharing capture. In the example of FIG. 3B, apparatus 311 receives capture share rejection 315 and remains in a non-sharing capture mode.

FIG. 3C is an interaction diagram illustrating interaction associated with a sharing capture mode according to at least one example embodiment. In at least one example embodiment, an apparatus sends a representational image indicative of a captured image to the at least one other apparatus. The sending of the representational image may utilize a communication device, such as a communication device of communication device 15 of FIG. 1. In at least one example embodiment, a representational image is an image that is indicative of another image. In at least one example embodiment, an image being indicative of another image relates to the image comprising a different version of the same content as the other image. For example, a representational image may relate to an image indicative of another image, but that differs with respect to size, resolution, and/or the like. In at least one example embodiment, a representation image indicative of another image is the other image. For example, it may be desirable to provide a representational image that corresponds with full resolution of the captured image.

In at least one example embodiment, the apparatus determines the representational image based, at least in part, on the captured image. For example, the apparatus may determine the representation image in accordance with a communication guideline, a predetermined criteria, and/or the like. For example, it may be desirable to reducing the size of a representational image from the size of the captured image. Without limiting the claims in any way, at least one possible technical effect associated with such limitation may be to be able to conform to an expected shared image size, to reduce the amount of information being communicated among a capture share group, to reduce power consumed in association with communication of the representational image, and/or the like. In at least one example embodiment, the determination of the representational image comprises causing the representational image to be within a size threshold. In at least one example embodiment, a size threshold relates to a maximum size to be applied to generation of the representational image. The size threshold may relate to a representational size, such as the dimensional size of the image when rendered, a data size, such as the amount of bytes of data associated with the representational image, and/or the like. In at least one example embodiment, the size threshold is based, at least in part, on a transmission constraint associated with the sharing capture mode. In at least one example embodiment, the transmission constraint relates to a predetermined size constraint, a predetermined resolution constraint, and/or the like. In at least one example embodiment, the transmission constraint is associated with transmission of the representational image in a low power mode. For example, there may be a maximum size of a representational image that allows communication of the representational image to be performed within a low power communication message size.

In at least one example embodiment, capturing of the capture image causes the sending of the representational image. For example, the causation of the sending of the representational image may be in response to capturing of the captured image. In at least one example embodiment, causation of the sending of the representational image occurs absent an intervening user input. In at least one example embodiment, causation of the sending of the representational image occurs absent an intervening user input is referred to as automatically causing the sending of the representational image. For example, the apparatus may cause the representational image to be sent without the user performing any input associated with sending the representational image between capture of the captured image and sending of the representational image. In another example, the apparatus may cause the representational image to be sent without the user performing any input between capture of the captured image and sending of the representational image. In at least one example embodiment, when an apparatus sends a representational image to another apparatus, the image received by the other apparatus is referred to as a shared image.

In at least one example embodiment, sending of the representational image relates to sending the representational image to a server, for example a cloud server, and providing an address associated with the cloud server to another apparatus. For example, the apparatus may send the representation image to the other apparatus by sending the representational image to a cloud server for access by way of an address, such as a URL, and sending the address to the other apparatus.

In the example of FIG. 3C, apparatus 321 captures a captured image at block 323, while operating in a sharing capture mode. Apparatus 321 sends a representational image indicative of the captured image to apparatus 322 by way of interaction 324. Upon receiving representational image from apparatus 321 by way of interaction 324, apparatus 322 receives the representational image as a shared image.

FIG. 3D is an interaction diagram illustrating interaction associated with a sharing capture mode according to at least one example embodiment. In at least one example embodiment, an apparatus may be in a share group with more than one other apparatus. In such an example, the apparatus may send at least one representational image to more than one apparatus.

In the example of FIG. 3D, apparatus 331 captures a captured image at block 333, while operating in a sharing capture mode. Apparatus 331 sends a representational image indicative of the captured image to apparatus 332 by way of interaction 334 and sends the representational image to apparatus 336 by way of interaction 335. Upon receiving representational image from apparatus 331 by way of interaction 334, apparatus 332 receives the representational image as a shared image. Upon receiving representational image from apparatus 331 by way of interaction 335, apparatus 336 receives the representational image as a shared image.

FIG. 3E is an interaction diagram illustrating interaction associated with a sharing capture mode according to at least one example embodiment. In at least one example embodiment, an apparatus sends a request for a different version of the shared image to the at least one other apparatus. The request may be sent similarly as described regarding a capture share request. In at least one example embodiment, the different version relates to a different image resolution than the shared image. In at least one example embodiment, the shared image is associated with an image resolution and the different image resolution is associated with a higher resolution than the image resolution. In at least one example embodiment, the different image resolution relates to full image resolution. In at least one example embodiment, the apparatus receives a different shared image correlates to the different version of the first shared image. For example, the different shared image may be a full resolution version of the shared image.

In at least one example embodiment, the apparatus receives a request for a different version of the captured image from the at least one other apparatus. In at least one example embodiment, the different image resolution relates to the image resolution of the captured image. For example, the request for the different version may be a request for a full resolution version of the captured image. In at least one example embodiment, the apparatus sends a different representational image that correlates to the different version of the captured image. In at least one example embodiment, the apparatus determines the different representational image, similarly as described regarding FIG. 3C.

In the example of FIG. 3E, apparatus 341 captures a captured image at block 343, while operating in a sharing capture mode. Apparatus 341 sends a representational image indicative of the captured image to apparatus 342 by way of interaction 344. Upon receiving representational image from apparatus 341 by way of interaction 344, apparatus 342 receives the representational image as a shared image. Apparatus 342 sends a different version request to apparatus 341 by way of interaction 345. Apparatus 341 receives the request for a different version of the captured image by way of interaction 345. Apparatus 341 sends a different representation of the captured image to apparatus 342 by way of interaction 346. Apparatus 342 receives a different shared image by way of interaction 346.

FIG. 3F is an interaction diagram illustrating interaction associated with a sharing capture mode according to at least one example embodiment. As previously described, a user may desire to provide a comment or a like expression in association with a shared image. In at least one example embodiment, an apparatus may send the comment or like expression to one or more apparatus. For example, the apparatus may send a comment to the apparatus from which the shared image was received, as well as another apparatus.

In the example of FIG. 3F, apparatus 351 captures a captured image at block 353, while operating in a sharing capture mode. Apparatus 351 sends a representational image indicative of the captured image to apparatus 352 by way of interaction 354 and sends the representational image to apparatus 356 by way of interaction 355. Upon receiving representational image from apparatus 351 by way of interaction 354, apparatus 352 receives the representational image as a shared image. Upon receiving representational image from apparatus 351 by way of interaction 355, apparatus 356 receives the representational image as a shared image.

In the example of FIG. 3F, apparatus 352 may receive input indicative of a comment associated with the shared image received from apparatus 351. Apparatus 352 sends a shared image comment to apparatus 351 by way of interaction 358. Apparatus 351 receives the shared image comment of the captured image by way of interaction 358. Apparatus 352 sends a shared image comment to apparatus 356 by way of interaction 357. Apparatus 356 receives the shared image comment of the shared image by way of interaction 357.

Figure 4:
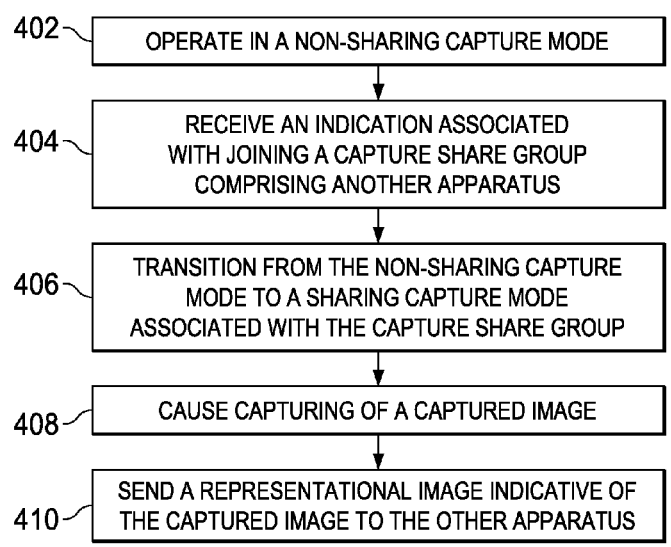
FIG. 4 is a flow diagram illustrating activities associated with a sharing capture mode according to at least one example embodiment.

FIG. 4 is a flow diagram illustrating activities associated with a sharing capture mode according to at least one example embodiment. In at least one example embodiment, there is a set of operations that corresponds the activities of FIG. 4. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 4.

At block 402, the apparatus operates in a non-sharing capture mode. The operation and the non-sharing capture mode may be similar as described regarding FIGS. 2A-2F.

At block 404, the apparatus receives an indication associated with joining a capture share group, the capture share group comprising at least one other apparatus. The receiving of the indication, the indication the capture share group and the joining of the capture share group may be similar as described regarding FIG. 2A-2F and FIGS. 3A-3F.

At block 406, the apparatus transitions from the non-sharing capture mode to a sharing capture mode associated with the capture share group, based, at least in part, on the indication. The transition, the sharing capture mode, and the association between the capture share group and the sharing capture mode may be similar as described regarding FIGS. 2A-2F.

At block 408, the apparatus causes capturing of a captured image. The capturing, the causation of capturing, and the captured image may be similar as described regarding FIGS. 2A-2F.

At block 410, the apparatus sends a representational image indicative of the captured image to the at least one other apparatus. The sending and the representational image may be similar as described regarding FIGS. 3A-3F.

Figure 5:
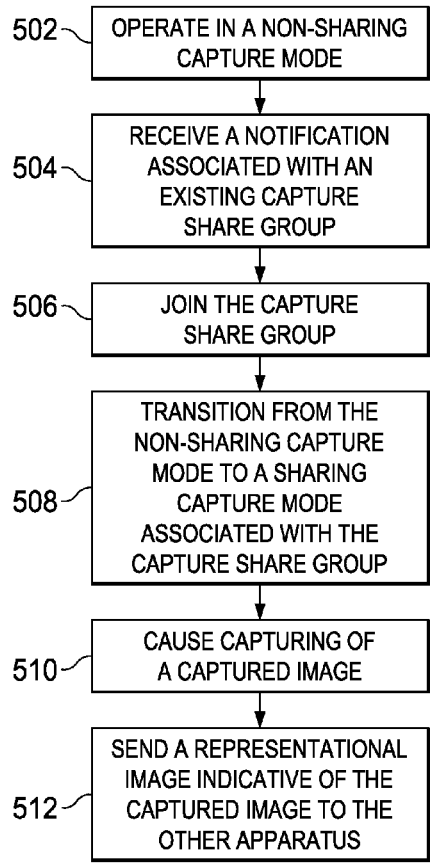
FIG. 5 is a flow diagram illustrating activities associated with a sharing capture mode according to at least one example embodiment.

FIG. 5 is a flow diagram illustrating activities associated with a sharing capture mode according to at least one example embodiment. In at least one example embodiment, there is a set of operations that corresponds the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus operates in a non-sharing capture mode, similarly as described regarding block 402 of FIG. 4. At block 504, the apparatus receives a notification associated with an existing capture share group, and the capture share group is the existing capture share group. The receiving, the notification, and the existing capture share group may be similar as described regarding FIGS. 3A-3F. At block 506, the apparatus joins the capture share group. The joining may be similar as described regarding FIGS. 3A-3F. At block 508, the apparatus transitions from the non-sharing capture mode to a sharing capture mode associated with the capture share group, based, at least in part, on the indication, similarly as described regarding block 406 of FIG. 4. At block 510, the apparatus causes capturing of a captured image, similarly as described regarding block 408 of FIG. 4. At block 512, the apparatus sends a representational image indicative of the captured image to the at least one other apparatus, similarly as described regarding block 410 of FIG. 4.

Figure 6:
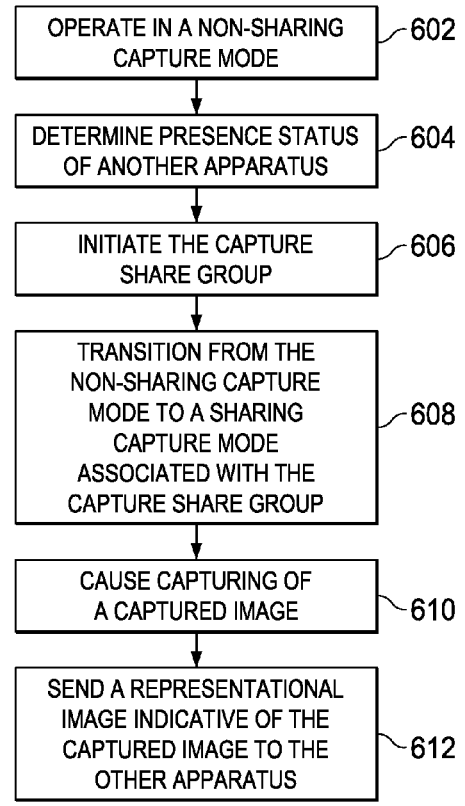
FIG. 6 is a flow diagram illustrating activities associated with a sharing capture mode according to at least one example embodiment.

FIG. 6 is a flow diagram illustrating activities associated with a sharing capture mode according to at least one example embodiment. In at least one example embodiment, there is a set of operations that corresponds the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus operates in a non-sharing capture mode, similarly as described regarding block 402 of FIG. 4. At block 604, the apparatus determines presence status of the at least one other apparatus. The determination, the presence, and the presence status may be similar as described regarding FIGS. 3A-3F. At block 606, the apparatus initiates a capture share group. The initiation and the capture share group may be similar as described regarding FIGS. 2A-2F and FIGS. 3A-3F. At block 608, the apparatus transitions from the non-sharing capture mode to a sharing capture mode associated with the capture share group, based, at least in part, on the indication, similarly as described regarding block 406 of FIG. 4. At block 610, the apparatus causes capturing of a captured image, similarly as described regarding block 408 of FIG. 4. At block 612, the apparatus sends a representational image indicative of the captured image to the at least one other apparatus, similarly as described regarding block 410 of FIG. 4.

Figure 7:
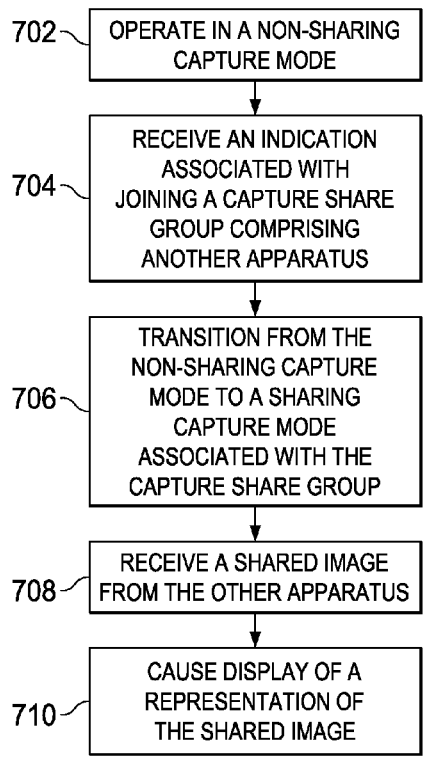
FIG. 7 is a flow diagram illustrating activities associated with a sharing capture mode according to at least one example embodiment.

FIG. 7 is a flow diagram illustrating activities associated with a sharing capture mode according to at least one example embodiment. In at least one example embodiment, there is a set of operations that corresponds the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus operates in a non-sharing capture mode, similarly as described regarding block 402 of FIG. 4. At block 704, the apparatus receives an indication associated with joining a capture share group, the capture share group comprising at least one other apparatus, similarly as described regarding block 404 of FIG. 4. At block 706, the apparatus transitions from the non-sharing capture mode to a sharing capture mode associated with the capture share group, based, at least in part, on the indication, similarly as described regarding block 406 of FIG. 4. At block 708, the apparatus receives a shared image from the at least one other apparatus. The receiving and the shared image may be similar as described regarding FIGS. 2A-2F and FIGS. 3A-3F. At block 710, the apparatus causes display of a representation of the shared image. The causation of display and the representation of the shared image may be similar as described regarding FIGS. 2A-2F.

Figure 8:
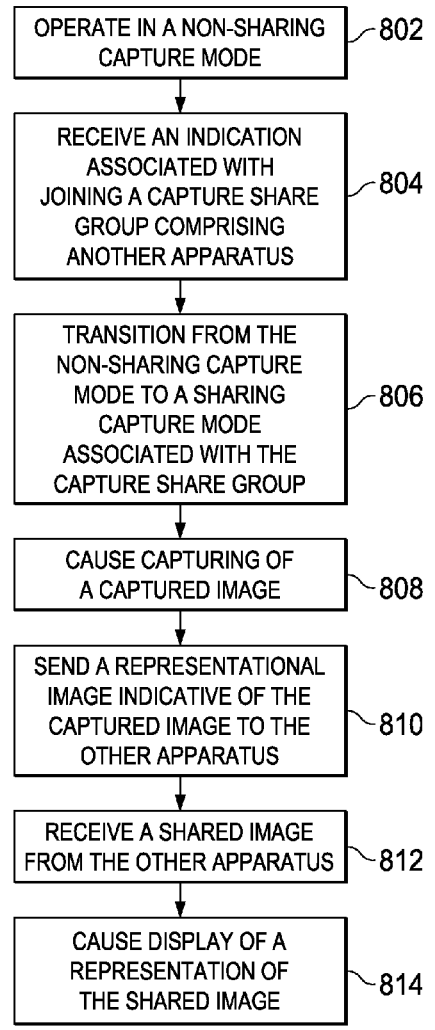
FIG. 8 is a flow diagram illustrating activities associated with a sharing capture mode according to at least one example embodiment.

FIG. 8 is a flow diagram illustrating activities associated with a sharing capture mode according to at least one example embodiment. In at least one example embodiment, there is a set of operations that corresponds the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus operates in a non-sharing capture mode, similarly as described regarding block 402 of FIG. 4. At block 804, the apparatus receives an indication associated with joining a capture share group, the capture share group comprising at least one other apparatus, similarly as described regarding block 404 of FIG. 4. At block 806, the apparatus transitions from the non-sharing capture mode to a sharing capture mode associated with the capture share group, based, at least in part, on the indication, similarly as described regarding block 406 of FIG. 4. At block 808, the apparatus causes capturing of a captured image, similarly as described regarding block 408 of FIG. 4. At block 810, the apparatus sends a representational image indicative of the captured image to the at least one other apparatus, similarly as described regarding block 410 of FIG. 4. At block 812, the apparatus receives a shared image from the at least one other apparatus, similarly as described regarding block 708 of FIG. 7. At block 814, the apparatus causes display of a representation of the shared image, similarly as described regarding block 710 of FIG. 7.

Figures 9, 10:
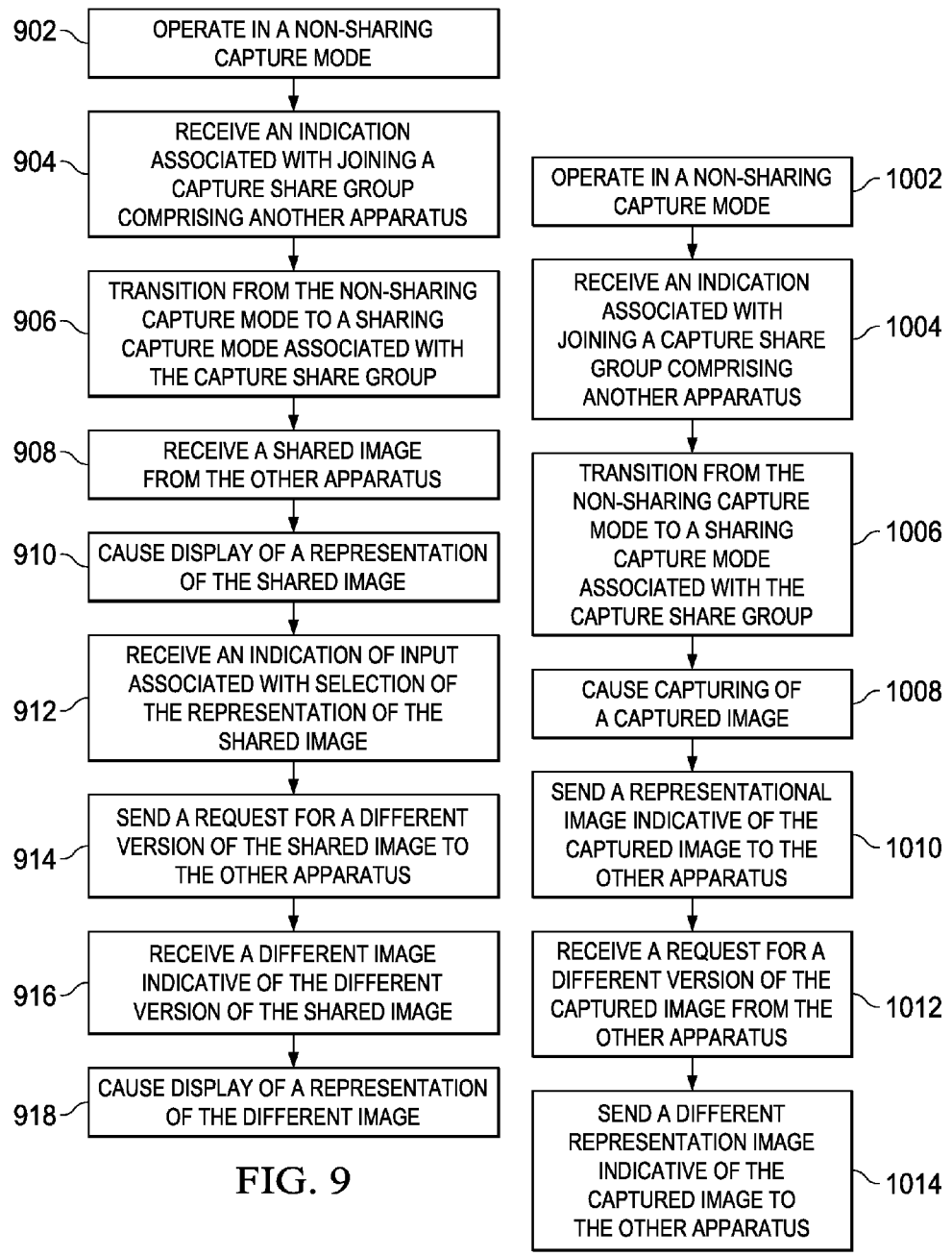
FIG. 9 is a flow diagram illustrating activities associated with a sharing capture mode according to at least one example embodiment.
FIG. 10 is a flow diagram illustrating activities associated with a sharing capture mode according to at least one example embodiment.

FIG. 9 is a flow diagram illustrating activities associated with a sharing capture mode according to at least one example embodiment. In at least one example embodiment, there is a set of operations that corresponds the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus operates in a non-sharing capture mode, similarly as described regarding block 402 of FIG. 4. At block 794, the apparatus receives an indication associated with joining a capture share group, the capture share group comprising at least one other apparatus, similarly as described regarding block 404 of FIG. 4. At block 906, the apparatus transitions from the non-sharing capture mode to a sharing capture mode associated with the capture share group, based, at least in part, on the indication, similarly as described regarding block 406 of FIG. 4. At block 908, the apparatus receives a shared image from the at least one other apparatus, similarly as described regarding block 708 of FIG. 7. At block 910, the apparatus causes display of a representation of the shared image, similarly as described regarding block 710 of FIG. 7. At block 912, the apparatus receives an indication of input indicative of selection of the representation of the shared image. The indication of the input and the selection of the representation of the shared image may be similar as described regarding FIGS. 2A-2F and FIGS. 3A-3F. At block 914, the apparatus sends a request for a different version of the shared image to the at least one other apparatus The sending, the request, an different version may be similar as described regarding FIGS. 2A-2F and FIGS. 3A-3F. At block 916, the apparatus receives a different shared image that correlates to the different version of the shared image. The receiving, the different shared image, the different version of the shared image, and the correlation to the different version of the shared image may be similar as described regarding FIGS. 2A-2F and FIGS. 3A-3F. At block 918, the apparatus causes display of a representation of the different shared image, similarly as described regarding block 710 of FIG. 7.

FIG. 10 is a flow diagram illustrating activities associated with a sharing capture mode according to at least one example embodiment. In at least one example embodiment, there is a set of operations that corresponds the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus operates in a non-sharing capture mode, similarly as described regarding block 402 of FIG. 4. At block 1004, the apparatus receives an indication associated with joining a capture share group, the capture share group comprising at least one other apparatus, similarly as described regarding block 404 of FIG. 4. At block 1006, the apparatus transitions from the non-sharing capture mode to a sharing capture mode associated with the capture share group, based, at least in part, on the indication, similarly as described regarding block 406 of FIG. 4. At block 1008, the apparatus causes capturing of a captured image, similarly as described regarding block 408 of FIG. 4. At block 1010, the apparatus sends a representational image indicative of the captured image to the at least one other apparatus, similarly as described regarding block 410 of FIG. 4. At block 1012, the apparatus receives a request for a different version of the captured image from the at least one other apparatus. The receiving, the request, and the different version of the captured image may be similar as described regarding FIGS. 2A-2F and FIGS. 3A-3F. At block 1014, the apparatus sends a different representational image that correlates to the different version of the captured image. The sending, the different representational image, the different representational image, and the correlation to the different version may be similar as described regarding FIGS. 2A-2F and FIGS. 3A-3F.

Figure 11:
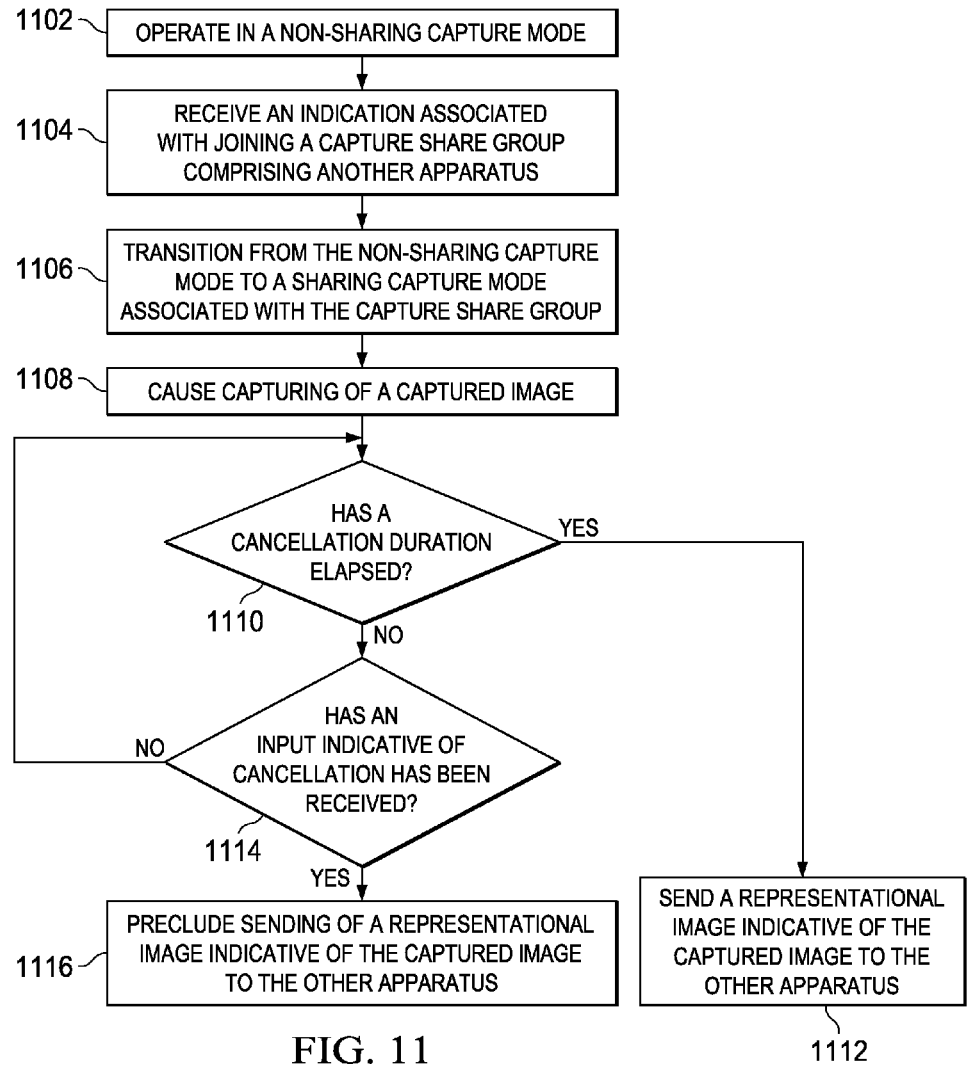
FIG. 11 is a flow diagram illustrating activities associated with a sharing capture mode according to at least one example embodiment.

FIG. 11 is a flow diagram illustrating activities associated with a sharing capture mode according to at least one example embodiment. In at least one example embodiment, there is a set of operations that corresponds the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus operates in a non-sharing capture mode, similarly as described regarding block 402 of FIG. 4. At block 1104, the apparatus receives an indication associated with joining a capture share group, the capture share group comprising at least one other apparatus, similarly as described regarding block 404 of FIG. 4. At block 1106, the apparatus transitions from the non-sharing capture mode to a sharing capture mode associated with the capture share group, based, at least in part, on the indication, similarly as described regarding block 406 of FIG. 4. At block 1108, the apparatus causes capturing of a captured image, similarly as described regarding block 408 of FIG. 4.

At block 1110, the apparatus causes deferment of sending of the representational image for a cancelation duration by determining whether the cancelation duration has elapsed. The deferment, the cancelation duration, and the determination may be similar as described regarding FIGS. 2A-2F. If the apparatus determines that the cancelation duration has elapsed, flow proceeds to block 1112. If the apparatus determines that the cancelation duration has not elapsed, flow proceeds to block 1114. At block 1112, the apparatus sends a representational image indicative of the captured image to the at least one other apparatus, similarly as described regarding block 410 of FIG. 4. At block 1114, the apparatus determines whether an input indicative of cancelation has been received. The determination, the input, and the receiving may be similar as described regarding FIGS. 2A-2F. If the apparatus determines that an input indicative of cancelation has not been received, flow proceeds to block 1110. If the apparatus determines that an input indicative of cancelation has been received, flow proceeds to block 1116. At block 1116, the apparatus precludes sending of the representational image. The preclusion may be similar as described regarding FIGS. 2A-2F.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1110 of FIG. 11 may be performed after block 1114. Furthermore, if desired, one or more of the above-described functions may be optional or may be combined. For example, block 504 of FIG. 5 may be optional and/or combined with block 404 of FIG. 4.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
a processor;
memory including computer program code, the memory and the computer program code configured to, working with the processor, cause the apparatus to perform at least the following:
operate in a non-sharing capture mode, the non-sharing capture mode being an image capture mode that captures images from a camera module and fails to automatically receive an image from a separate apparatus;
receive an indication of a user query to join a capture share group between a user of the apparatus and at least one other user of at least one other apparatus, the capture share group comprising the other apparatus;
transition from the non-sharing capture mode to a sharing capture mode associated with the capture share group based, at least in part, on the user query, the sharing capture mode being an image capture mode that captures images from a camera module and causes automatic receiving of an image by way of the capture share group;
cause display of a viewfinder based, at least in part, on the sharing capture mode, the viewfinder indicating image information that is being received from the camera module;
receive a shared image from the other apparatus based, at least in part, on the sharing capture mode;
cause display of the shared image in response to the receipt of the shared image, such that the shared image is displayed simultaneously with the viewfinder based, at least in part, on the sharing capture mode;
cause capturing of an image during the sharing capture mode;
receive information indicative of a cancelation input during the sharing capture mode and prior to elapse of a cancelation duration subsequent to capturing of the captured image;
generate a representational image in response to the receipt of the cancelation input, the representational image being indicative of the captured image and different from the captured image;
preclude sending of the representational image to the other apparatus based, at least in part, on the cancelation input;
cause display of the captured image in response to the capturing of the captured image, such that the captured image is displayed simultaneously with the viewfinder and the shared image based, at least in part, on the sharing capture mode; and
cause display of an indication that the captured image has been precluded from being sent, such that the indication that the captured image has been precluded from being sent is displayed simultaneously with the viewfinder.

2. The apparatus of claim 1, the memory and the computer program code configured to, working with the processor, cause the apparatus to perform at least the following:
receive an indication of input indicative of selection of the shared image;
send a request for a different version of the shared image to the at least one other apparatus in response to the input indicative of selection of the shared image; and
receive a different shared image that correlates to the different version of the shared image.

3. A method comprising:
operating in a non-sharing capture mode, the non-sharing capture mode being an image capture mode that captures images from a camera module and fails to automatically receive an image from a separate apparatus;
receiving an indication of a user query to join a capture share group between a user of the apparatus and at least one other user of at least one other apparatus, the capture share group comprising the other apparatus;
transitioning from the non-sharing capture mode to a sharing capture mode associated with the capture share group based, at least in part, on the user query, the sharing capture mode being an image capture mode that captures images from a camera module and causes automatic receiving of an image by way of the capture share group;
causing display of a viewfinder based, at least in part, on the sharing capture mode, the viewfinder indicating image information that is being received from the camera module;
receiving a shared image from the other apparatus based, at least in part, on the sharing capture mode;
causing display of the shared image in response to the receipt of the shared image, such that the shared image is displayed simultaneously with the viewfinder based, at least in part, on the sharing capture mode;
causing capturing of an image during the sharing capture mode;
receiving information indicative of a cancelation input during the sharing capture mode and prior to elapse of a cancelation duration subsequent to capturing of the captured image;

generating a representational image in response to the receipt of the cancelation input, the representational image being indicative of the captured image and different from the captured image;
precluding sending of the representational image to the other apparatus based, at least in part, on the cancelation input;
causing display of the captured image in response to the capturing of the captured image, such that the captured image is displayed simultaneously with the viewfinder and the shared image based, at least in part, on the sharing capture mode; and
causing display of an indication that the captured image has been precluded from being sent, such that the indication that the captured image has been precluded from being sent is displayed simultaneously with the viewfinder.

4. The method of claim 3, further comprising:
receiving an indication of input indicative of selection of the shared image;
sending a request for a different version of the shared image to the at least one other apparatus in response to the input indicative of selection of the shared image; and
receiving a different shared image that correlates to the different version of the shared image.

5. The apparatus of claim 1, wherein the receipt of the indication associated with joining the capture share group comprises receipt of a capture share request from the at least one other apparatus and sending of a capture share acceptance to the at least one other apparatus.

6. The apparatus of claim 1, wherein the receipt of the indication associated with joining the capture share group comprises sending a capture share request to the at least one other apparatus and receiving a capture share acceptance from the at least one other apparatus.

7. The apparatus of claim 1, the memory and the computer program code configured to, working with the processor, cause the apparatus to perform at least the following:
cause capturing of an image during the sharing capture mode;
determine that, during the sharing capture mode, a cancelation duration has elapsed subsequent to capturing of the captured image and absent receipt of a cancelation input;
generate a representational image in response to the determination that, during the sharing capture mode, the cancelation duration has elapsed absent receipt of a cancelation input, the representational image being indicative of the captured image and different from the captured image; and
send the representational image to at least one other apparatus based, at least in part, on the sharing capture mode.

8. The apparatus of claim 7, the memory and the computer program code configured to, working with the processor, cause the apparatus to perform at least the following cause display of the captured image in response to the capturing of the captured image, such that the captured image is displayed simultaneously with the viewfinder and the shared image based, at least in part, on the sharing capture mode.

9. The method of claim 3, wherein the receipt of the indication associated with joining the capture share group comprises receiving a capture share request from the at least one other apparatus and sending a capture share acceptance to the at least one other apparatus.

10. The method of claim 3, wherein the receipt of the indication associated with joining the capture share group comprises sending a capture share request to the at least one other apparatus and receiving a capture share acceptance from the at least one other apparatus.

11. The method of claim 3, further comprising:
causing capture of an image during the sharing capture mode;
determining that, during the sharing capture mode, a cancelation duration has elapsed subsequent to capturing of the captured image and absent receipt of a cancelation input;
generating a representational image in response to the determination that, during the sharing capture mode, the cancelation duration has elapsed absent receipt of a cancelation input, the representational image being indicative of the captured image and different from the captured image; and
sending the representational image to at least one other apparatus based, at least in part, on the sharing capture mode.

12. The method of claim 11, further comprising causing display of the captured image in response to the capturing of the captured image, such that the captured image is displayed simultaneously with the viewfinder and the shared image based, at least in part, on the sharing capture mode.

13. An apparatus, comprising:
a processor;
memory including computer program code, the memory and the computer program code configured to, working with the processor, cause the apparatus to perform at least the following:
operate in a non-sharing capture mode, the non-sharing capture mode being an image capture mode that fails to automatically send an image in response to capture of the image;
receive an indication of a user query to join a capture share group between a user of the apparatus and at least one other user of at least one other apparatus, the capture share group comprising the other apparatus;
transition from the non-sharing capture mode to a sharing capture mode associated with the capture share group, based, at least in part, on the user query, the sharing capture mode being an image capture mode that causes automatic sending of a particular image in response to capture of the particular image;
cause capturing of an image during the sharing capture mode;
determine that, during the sharing capture mode, a cancelation duration has elapsed subsequent to capturing of the captured image and absent receipt of a cancelation input;
generate a representational image in response to the determination that, during the sharing capture mode, the cancelation duration has elapsed absent receipt of a cancelation input, the representational image being indicative of the captured image and different from the captured image;
cause display of the captured image in response to the capturing of the captured image;
send the representational image to at least one other apparatus based, at least in part, on the sharing capture mode;
cause capturing of another image during the sharing capture mode;
receive information indicative of the cancelation input during the sharing capture mode and prior to elapse of another cancelation duration subsequent to capturing of the other captured image;
generate another representational image in response to the receipt of the cancelation input, the other representational image being indicative of the other captured image and different from the other captured image;

preclude sending of the other representational image to the other apparatus based, at least in part, on the cancelation input;

cause display of the other captured image in response to the capturing of the other captured image, such that the other captured image is displayed simultaneously with the captured image based, at least in part, on the sharing capture mode; and cause display of an indication that the other captured image has been precluded from being sent, such that the indication that the other captured image has been precluded from being sent is displayed simultaneously with the captured image and the other captured image.

14. The apparatus of claim 13, the memory and the computer program code configured to, working with the processor, cause the apparatus to perform at least the following:

receive a request for a different version of the representational image from the other apparatus;

generate a different representational image in response to the request for the different version of the representational image, the different representational image being indicative of the captured image and different from the captured image and different from the representational image; and send the different representational image that correlates to the different version of the first shared image.

15. The apparatus of claim 13, wherein the generation of the representational image comprises generation of the representational image to be within a size threshold.

16. The apparatus of claim 15, wherein the size threshold is based, at least in part, on a transmission constraint associated with the sharing capture mode transmission of the representational image in a low power mode.

17. The apparatus of claim 1, wherein the indication that the captured image has been precluded from being sent is at least one of an icon, a border, and a color that, at least partially, overlays the captured image.

18. The apparatus of claim 1, wherein the preclusion of sending of the representational image to the other apparatus is based, at least in part, on the receipt of the cancellation input prior to elapse of the cancelation duration subsequent to capturing of the captured image.

19. The method of claim 3, wherein the indication that the captured image has been precluded from being sent is at least one of an icon, a border, and a color that, at least partially, overlays the captured image.

20. The apparatus of claim 13, wherein the indication that the other captured image has been precluded from being sent is at least one of an icon, a border, and a color that, at least partially, overlays the other captured image.

* * * * *